US008001528B2

(12) United States Patent (10) Patent No.: US 8,001,528 B2
Bernabeu-Auban et al. (45) Date of Patent: Aug. 16, 2011

(54) ORGANIZATION OF APPLICATION STATE AND CONFIGURATION SETTINGS

(75) Inventors: Jose M. Bernabeu-Auban, Sammamish, WA (US); Stephen E. Dossick, Redmond, WA (US); Frank V. Peschel-Gallee, Redmond, WA (US); Stephan J. Zachwieja, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1509 days.

(21) Appl. No.: 11/393,351

(22) Filed: Mar. 30, 2006

(65) Prior Publication Data

US 2007/0261048 A1 Nov. 8, 2007

(51) Int. Cl.
*G06F 9/44* (2006.01)
*G06F 9/45* (2006.01)
*G06F 13/00* (2006.01)

(52) U.S. Cl. ........ 717/121; 717/164; 717/167; 717/169; 719/319; 719/329; 719/332

(58) Field of Classification Search ........................ None
See application file for complete search history.

(56) References Cited

U.S. PATENT DOCUMENTS

| | | | |
|---|---|---|---|
| 6,363,400 B1 * | 3/2002 | Chtchetkine et al. | 1/1 |
| 6,678,712 B1 * | 1/2004 | McLaren et al. | 718/100 |
| 7,072,956 B2 * | 7/2006 | Parupudi et al. | 709/223 |
| 7,222,341 B2 * | 5/2007 | Forbes et al. | 717/170 |
| 7,623,846 B2 * | 11/2009 | Hybre et al. | 455/411 |
| 2002/0124067 A1 * | 9/2002 | Parupudi et al. | 709/223 |
| 2002/0144248 A1 * | 10/2002 | Forbes et al. | 717/167 |
| 2004/0122917 A1 * | 6/2004 | Menon et al. | 709/219 |
| 2004/0172421 A1 * | 9/2004 | Saito et al. | 707/200 |
| 2005/0091658 A1 * | 4/2005 | Kavalam et al. | 718/104 |
| 2005/0234931 A1 * | 10/2005 | Yip et al. | 707/100 |
| 2006/0161582 A1 * | 7/2006 | Aghajanyan | 707/103 R |
| 2006/0184926 A1 * | 8/2006 | Or et al. | 717/168 |

OTHER PUBLICATIONS

Price et al. "Solaris Zones: Operating System Support for Consolidating Commercial Workloads", Nov. 14-19, 2004, Sun Microsystem, Inc., pp. 243-255.*
GConf Configuration System, http://www.gnome.org/projects/gconf, 2006, 8 pages.

* cited by examiner

*Primary Examiner* — Tuan Q Dam
*Assistant Examiner* — Isaac T Tecklu
(74) *Attorney, Agent, or Firm* — Woodcock Washburn LLP

(57) ABSTRACT

The operating system manages software entities by creating a construct called a context that organizes and manages software-related state and configuration settings of applications. A context may comprise an installation service, a configuration service and an activation service. Contexts can be linked or arranged hierarchically to form parent-child relationships. Hierarchies may be used to affect accessibility of software items, to satisfy dependencies, to control the visibility/invisibility of software items, to provide access to configuration settings and to override software availability, dependencies and configuration settings. An override may be applied to set policy when more than one context has a configuration setting, dependency or access to a software entity.

17 Claims, 3 Drawing Sheets

ORGANIZATION OF APPLICATION STATE AND CONFIGURATION SETTINGS

BACKGROUND

A typical operating system does not know what executable software resides on the machine nor does it know what resources are needed by the software to execute. It follows, therefore, that the operating system can have no knowledge of how or if one piece of software depends on another and will be unable to determine if a particular piece of software will run.

An application that is written to be run by a current operating system typically assumes that it will have access to a global namespace, used to resolve names and obtain values and resources. A number of drawbacks are associated with the use of a global namespace. It is difficult to keep track of the state and configuration parameters of an application, especially if the application can be run concurrently at the system-wide level and at a user level, because configuration parameters and current state are stored in the global namespace and no structure for distinguishing system-wide versus user-specific values for the application is provided by the operating system. Secondly, machine resources accessed via a global namespace are shared by all the applications running on the machine. Applications can interfere with each other via this global shared namespace. For example, one executing application may store its state in a file of a particular name in the global namespace. A second application may store its state in a file of the same name. If the applications execute concurrently, the applications may overwrite each other's state. Additionally, access to the resources is typically controlled by ACLs (access control lists) which associate access privileges with the identity of the user running the application. It follows that an application may well have access to resources that it does not need, enabling a malicious user to compromise the integrity of the system. Finally, use of a global namespace may prevent an application from being easily used to perform a slightly different task than the one for which it was originally intended. For example, an application which translates text from English to Spanish may expect the input and output files to have particular names, making it difficult to use the application to accept a different input file and produce a different output file without modifying the code.

SUMMARY

The operating system manages a set of software entities by creating a construct called a context that organizes and manages software-related state and configuration settings of applications. Software-related state includes the condition of the software entities themselves, their property settings and the setting of activation policies. The context may include an installation service, a configuration service and an activation service. The installation service is responsible for installing, uninstalling and servicing software entities within its context. The installation service keeps track of what software is installed and available within the context, the version of the installed software, what resources are needed by the software to run and what configuration properties or settings have been defined for the software entity. The installation service makes installed software entities available to the activation service. The activation service maintains and manages resolution polices, resolves configuration settings and resource values, constructs the environment in which an application runs and initiates the running of the software. The configuration service maintains and manages configuration settings associated with the software and provides configuration settings to the activation service.

One type of software entity managed by the context is a software item. A software item is a uniquely-identified piece of code (source and/or executable) accompanied by metadata, packaged into a single unit. The metadata may be provided in the form of a manifest. Metadata may include versioning information, a description of the configuration data the code uses, resources the code may need to run, dependencies, and other information. A dependency refers to the requirement of one software entity for a second software entity to be available. A software item may have a dependency on one or more other software items. One or more contexts may be created for the execution of a software item.

Contexts can be linked or arranged hierarchically to form parent-child relationships. Parent-child relationships may ease centralized management and policy setting. A parent context may have one or more children. A child context may have one or more parents. When multiple parents exist, the possibility of conflicts are addressed by assigning a priority to each of the multiple parents, with the parent having the highest priority ultimately determining how the conflict is resolved. Hierarchies may be used to affect accessibility of software items, to satisfy dependencies, to control the visibility/invisibility of software items, to provide access to configuration settings and to override software availability, dependencies and configuration settings. An override may be applied to set policy when more than one context has a configuration setting, dependency or access to a software entity.

DETAILED DESCRIPTION

Overview

An operating system according to some embodiments of the present invention is aware of what executable software resides on the machine and what resources are needed by the software to execute. The operating system is aware of how or if one piece of software depends on another and is able to determine if a particular piece of software will run. The operating system is aware of what other software is needed for the software to run.

Even though an application may be written assuming that it will have access to a global namespace, such a namespace may be mapped differently for each application execution, giving access to only those resources needed by the application to perform its task during that execution. A structure for managing and tracking state and configuration parameters of an application is provided by the operating system. In some embodiments of the invention, the structure for managing and tracking state and configuration settings is the context. One or more contexts may be created for the execution of the application. A context may include an installation service, a configuration service and an activation service. Use of a context may enable an application to perform a slightly different task than the one for which it was originally intended. For example, in the case of the application which translates text from English to Spanish described above, putting the application in a different context would enable the input and output files to have the same names, but refer to different files.

Exemplary Computing Environment

Figure 1:
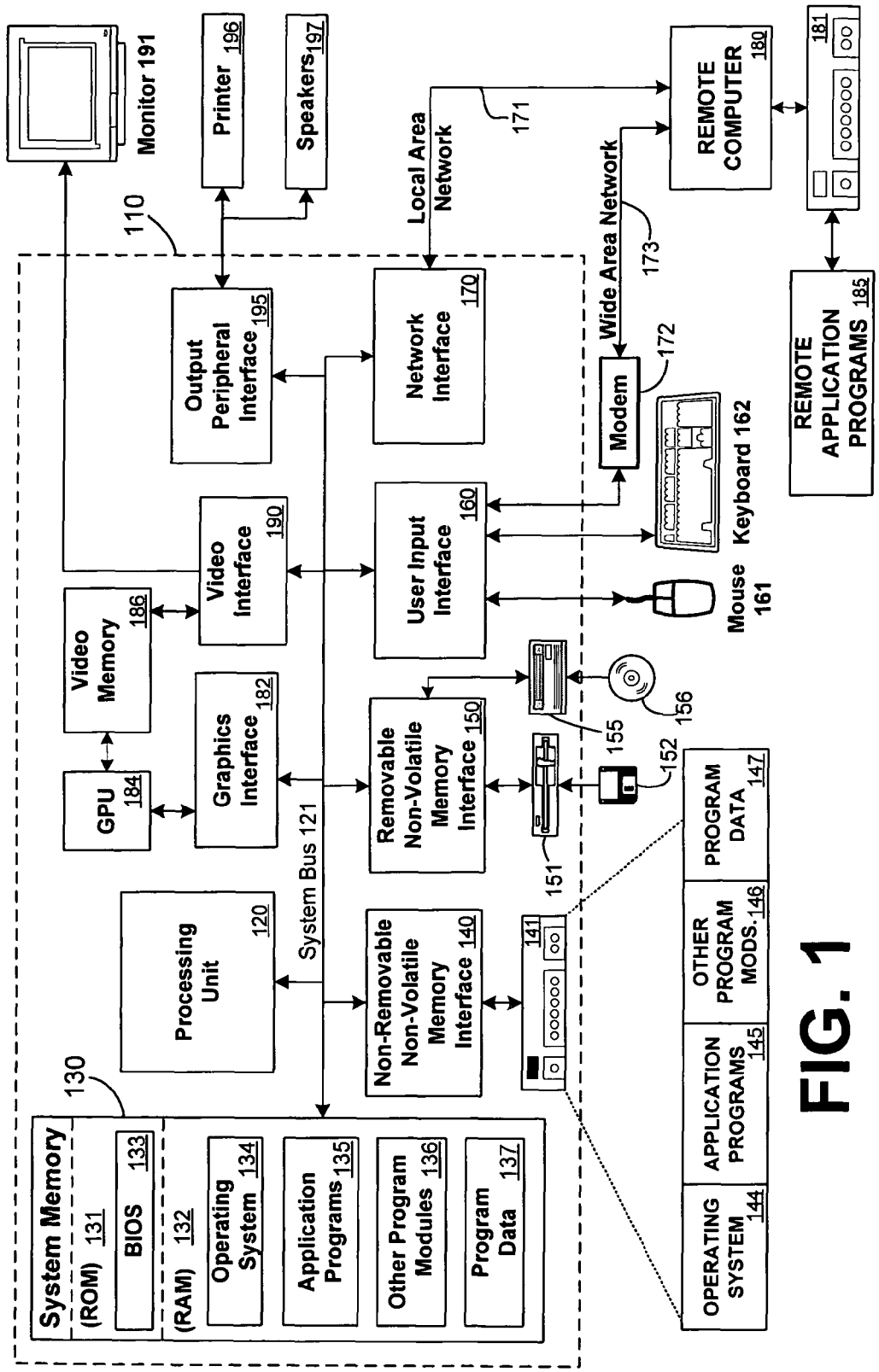
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 1 10. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Organizing State and Configurations Settings of Applications in a Computer System The operating system manages a set of software entities by creating a construct called a context. A context is used to organize software-related state and configuration settings for one or more applications and to describe an execution environment in which the application may run. Software-related state includes the condition of the software entities themselves (e.g., installed/visible/version/configuration settings/dependencies, etc.), their property settings and the setting of activation policies. A context may represent a system context, developer context, manager context, user context or other type of context. When an application is started, the context determines the required resources and makes the required resources accessible to the application. The context may also limit the resources an application running within the context is able to access, based on policy decisions, for example. Resources include but are not limited to values or pointers to system namespaces such as file systems, network devices, shared memory components, and service endpoints.

One type of software entity that is managed by a context is a software item. A software item is a resource known to the operating system by a unique name or identifier. A software item in some embodiments includes program code and associated data, packaged into a single unit. The associated data may include version information (typically presented as a number that is incremented as changes are made to the software over its lifetime). The software item may include the source and/or executable code and may be accompanied by metadata. In some embodiments of the invention, the metadata accompanying the code is provided in a manifest. The metadata may include the unique identifier for the versioning information, a description of the configuration data the code uses, resources the code may need to run, dependencies, and other information. A dependency refers to the requirement of one software entity for a second software entity. A software entity may have a dependency on another software entity or on other software entities. That is, for example, a software entity such as a software item, (e.g., Software Item D), may require the presence of another software item, (e.g., Software Item C), in order to run. The dependency may be required or optional. For example, instead of being required, Software Item C may add functionality but not be necessary for Software Item D to run. (For example, a word processing program may have an optional thesaurus installed but the word processing program may not require the thesaurus to run.) Dependencies may have version requirements, (e.g., Software Item C, version 2 must be present for Software Item D, version 4 to run). The list of software items that are used to satisfy each dependency may be calculated when the software item is installed. Each time a software item is installed, the way dependencies are satisfied may be altered, requiring the re-computation of dependencies.

Figure 2A:
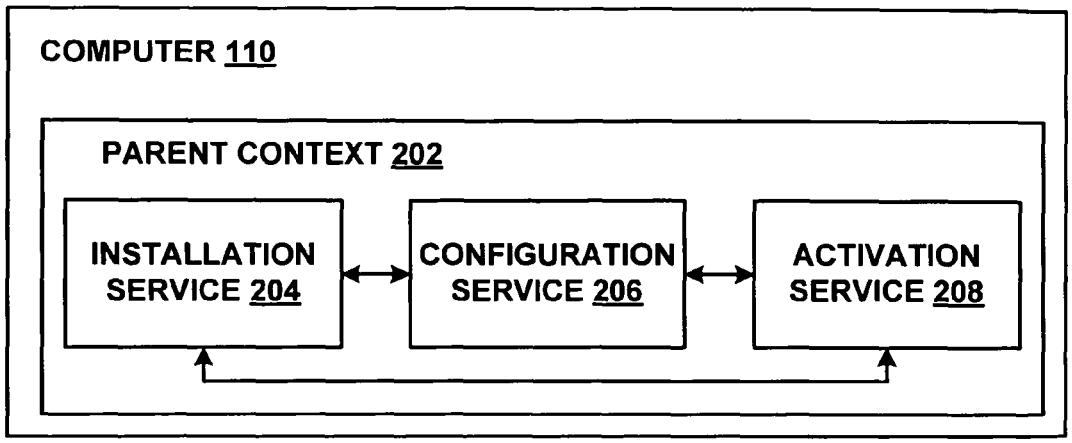
FIGS. 2a and b are block diagrams of systems for organizing state and configuration data for applications in accordance with some embodiments of the invention.

A context may include an installation service, a configuration service and an activation service. FIG. 2a illustrates one embodiment of a system 200 for organizing state and configuration settings for one or more applications as described above. System 200 may reside on a computer such as computer 110 described above with respect to FIG. 1. In FIG. 2a, a context 202 includes an installation service 204, a configuration service 206 and an activation service 208.

An installation service (e.g., installation service 204) keeps track of what software is installed and available within the context, the version of the installed software, what resources are needed by the software to run and what configuration properties or settings have been defined for the software entity. The installation service 204 also installs, removes, and services software entities and makes the installed software entities available to the activation service 208. Servicing software entities makes a newer version of the software available to the system, and may include the installation of the newer version of the software and saving and organizing the metadata associated with the new software. New versions of software may be made available to reduce defects, improve function, provide new functions, modify previously provided functions, accommodate new hardware or for other well-known reasons.

The configuration service 206 maintains, manages and mediates configuration settings associated with the software. Before a software entity is activated, its properties must be initialized to proper values. The process of setting these values is called configuration. In some embodiments of the invention, property values for a software entity such as a software item are stored in a configuration store (not shown). The set of property values for an application in a context contributes to application state.

The activation service 208 constructs the environment in which an application will run and initiates the software. The activation service 208 resolves configuration settings and provides the software items with the values needed by the software item to execute. The activation service 208 resolves dependencies, determines if all dependencies are satisfied and loads the software items satisfying the dependencies (received from the installation service 204) into the execution environment. A software item may not be activated unless all of the required dependencies are satisfied.

Contexts may be linked or arranged hierarchically to form a directed acyclic graph. Parent-child relationships may be created to enable centralized management and to set policy. A parent context may have one or more children. A child context may have one or more parents. When multiple parents exist, the possibility of conflicts are addressed by assigning a priority to each of the multiple parents. Conflicts may arise because more than one parent has a configuration setting, override flag or visibility flag. A child context may be created based on a parent context. Hierarchies may be used to affect accessibility of software items, to satisfy dependencies, to control the visibility/invisibility of software items, to provide access to configuration settings and to override software availability, dependencies and configuration settings. Within a context, services can communicate with each other. Communication between services of different contexts is only allowed between like services and only from the child to the parent (e.g., installation service of context 1 can communicate with installation service of context 2 but not with configuration service of context 2, and only if context 1 is the child of context 2).

Figure 2B:
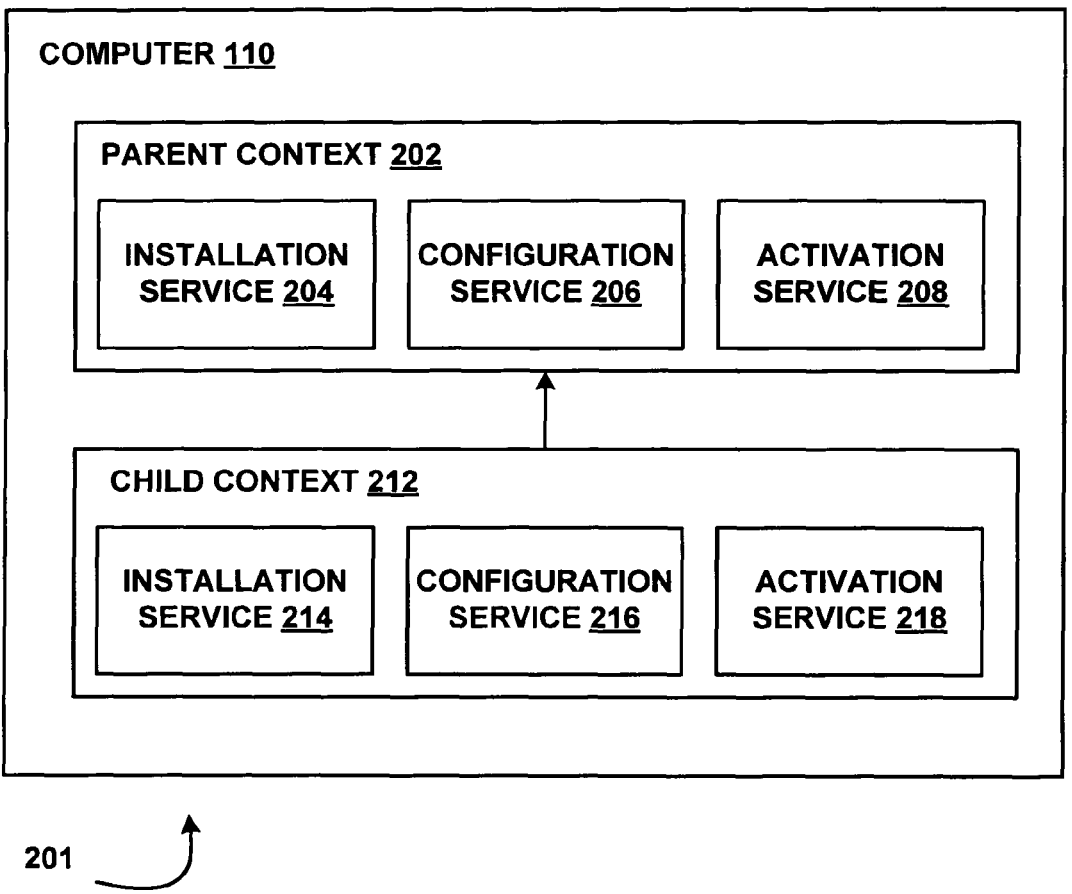

The ability to access software entities such as software items can be inherited through creation of a parent/child hierarchy. In general if a context such as Context U is linked to another context, Context S, where Context S is the parent of Context U, the software items installed in Context S are visible to Context U so that the set of software items available in Context U is the union of those available in Context U and those available in Context S. FIG. 2b illustrates one such hierarchy. In FIG. 2b, context 202 of FIG. 2a is a parent of a child context 212. Child context 212 includes an installation service 214, a configuration service 216 and an activation service 218. Child context 212 can inherit the software items of parent context 202. For example, suppose parent context 202 includes the following software items: Software Item A, version 1, Software Item A, version 2, Software Item B, version 1 and Software Item C version 2. Suppose child context 212 includes the following software items: Software Item D, version 1. Because of the creation of the parent-child context hierarchy, the child context 212 could activate all of the following software items: Software Item A, version 1, Software Item A, version 2, Software Item B, version 1, Software Item C version 2.0 and Software Item D, version 1. The parent context 202 would be able to activate Software Item A, version 1, Software Item A, version 2, Software Item B, version 1, Software Item C version 2 but would not be able to activate Software Item D, version 1.

A parent in a hierarchy may set visibility/invisibility flags for software entities such as software items within the hierarchy. Suppose for example, that a system administrator learns that there is a critical bug in Software Item A, version 1. Parent context 202 may make Software Item A, version 1 invisible and thus inaccessible to child context 212 by setting a visibility flag for Software Item A, version 1 to a value denoting invisibility. A parent can also override local state for software availability, dependencies, and configuration settings by setting an override flag for contexts below it in the hierarchy.

The ability to access dependencies and configuration settings can also be inherited through creation of such a hierarchy. For example, suppose now that Software Item E, version 2 having a dependency on Software Item B, version 1 were installed into child context 212 Suppose that child context 212 does not have Software Item B, version 1 but parent context 202 does. The dependency of Software Item E, version 2 on Software Item B, version 1 is satisfied because Software Item B, version 1 is installed in parent context 202. When Software Item E, version 2 is run, Software Item B, version 1 is loaded into the execution environment from parent context 202. Now suppose that configuration data for Software Item D, version 1 is installed in parent context 202 but is not installed in child context 212. Because there is configuration data in parent context 202 for Software Item D, version 1, this configuration data can be inherited by child context 212 and used by Software Item D, version 1 when this software item is activated and run in the child context 212. A parent in a hierarchy may set override flags for software items within the hierarchy. Override flags may be applied to software accessibility (visibility), dependencies, and configuration data. Suppose for example, that Software Item D, version 4 is installed in both parent context 202 and child context 212. Suppose further that Software Item D, version 4 has a dependency on Software Item C, version 2 Suppose that Software Item C, version 2 is installed in child context 212. Now suppose that there is a critical bug in Software Item C, version 2. By setting an override flag for Software Item C, version 2 in parent context 202, parent context 202 can substitute the use of another software item, say Software Item C, version 3 so that when Software Item D, version 4 is run in child context 212, Software Item C, version 3 is loaded instead of Software Item C, version 2. Although the example described is directed to overriding a dependency, it will be appreciated that overrides may also be applied to visibility or configuration data.

Figure 3:
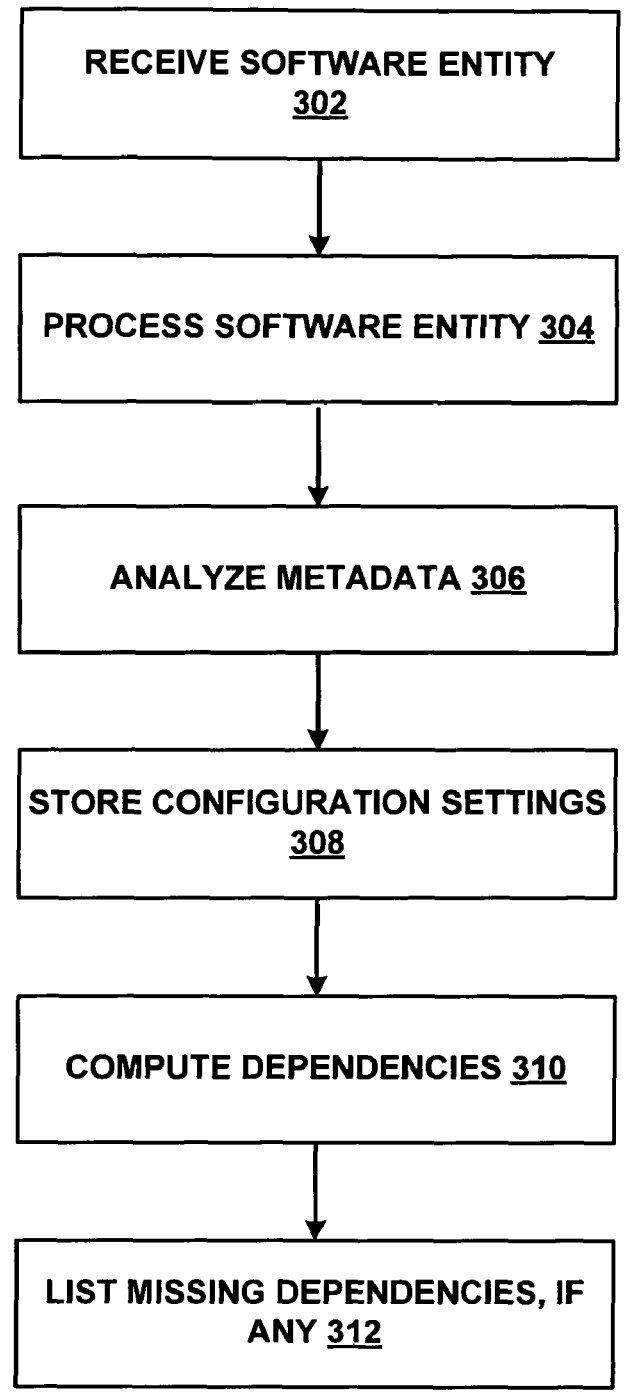
FIG. 3 is a flow diagram of a method for organizing state and configuration data for applications in accordance with some embodiments of the invention.

FIG. 3 illustrates a method 300 for organizing state and configuration of applications in accordance with some embodiments of the invention by creation of a context, as described above. At 302 a software entity is received. In some embodiments of the invention, the software entity is a software item, as described above and includes metadata. One way to provide this metadata is by a manifest. Metadata associated with the software item may include any of all of the following: versioning information, a description of the configuration data the code uses, resources the code may need to run, dependencies, and other information. At 304 a request to process the software entity is received. The request may include a request to install, a request to remove or a request to service the software entity. The software entity may be processed by the installation service described above. At 306 the metadata is analyzed. At 308 configuration settings included in the metadata are processed and stored by the configuration service. At 310, the configuration service may compute or re-compute dependencies of the software item being installed and any software items depending on the software item being installed. At 312 any missing dependencies for the installed software item may be listed. It will be appreciated that one of more of the above listed actions may be optional or skipped and that the actions may proceed in a sequence other than that depicted in FIG. 3.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer system comprising:
   a computer-readable storage medium having stored thereon at least a first software entity; and
   an operating system that creates a first context for managing a plurality of software entities that includes the first software entity and a second software entity, the first context configured for storing state settings, the state settings comprising information pertaining to a dependency of the first software entity on the second software entity;
   the first context comprising:
      a first installation service that manages installation of a first software item;
      a first configuration service that manages configuration settings associated with the first software item; and
      a first activation service that creates an execution environment for the first software item based on the configuration settings associated with the first software item;
   the operating system creates a second context based on the first context, the second context comprising:
      a second installation service that manages installation of the second software item;
      a second configuration service that manages configuration settings associated with the second software item; and
      a second activation service that creates an execution environment for the second software item based on the configuration settings associated with the second software item, the operating system being used to link the first context and the second context together such that the first context is a parent of the second context.

2. The system of claim 1, wherein the first context that is created by the operating system comprises:
   an installation service for storing, installing, removing and servicing the plurality of software entities;
   a configuration service for maintaining and managing configuration settings associated with the plurality of software entities;
   an activation service for creating an execution environment for the plurality of software entities, the activation service receiving the executable code for the plurality of software entities from the installation service and the configuration settings for the plurality of software entities from the configuration service.

3. The system of claim 2, wherein at least one software entity in the plurality of entities includes a resource comprising executable code and metadata packaged together into a unit, the metadata comprising at least one of: an identifier of the software entity, versioning information of the software entity, a description of configuration data the executable code uses, a list of resources the executable code requires, or a list of other software entities required by the executable code to execute.

4. The system of claim 1, wherein the operating system establishes a hierarchical link between the first context and a second context, wherein the first context is a parent context of the second context.

5. The system of claim 4, wherein the second context is a child context.

6. The system of claim 5, wherein software entities of the parent context are accessible to the child context.

7. The system of claim 6, wherein at least one of the software entities of the parent context is needed by executable code of a software entity of the child context to run.

8. The system of claim 5, wherein configuration settings for software entities of the parent context are accessible to the child context.

9. The system of claim 5, wherein the parent context controls the child context's access to software entities.

10. The system of claim 5, wherein the parent context controls the child context's access to configuration settings.

11. The system of claim 5, wherein the parent context can override values of configuration settings of the child context.

12. The computer system of claim 1, wherein the first context is used by the operating system to execute the first software entity in a different context than was intended when the first software entity was installed in the computer system.

13. The computer system of claim 1, wherein the second software entity is stored together with the first software entity in the computer-readable storage medium, and the first context is further configured to store information pertaining to a dependency of the second software entity on a third software entity.

14. A computer-readable storage medium having program code stored thereon that, when executed by a computing environment, causes the computing environment to:
   use an operating system to create a first context for managing a plurality of software entities;
   use the operating system to create a second context based on the first context, wherein the first context comprises:
      a first installation service that manages installation of a first software item;
      a first configuration service that manages configuration settings associated with the first software item; and
      a first activation service that creates an execution environment for the first software item based on the configuration settings associated with the first software item;
   and wherein the second context comprises:
      a second installation service that manages installation of the second software item;
      a second configuration service that manages configuration settings associated with the second software item; and
      a second activation service that creates an execution environment for the second software item based on the configuration settings associated with the second software item; and
   use the operating system to link the first context and the second context together such that the first context is a parent of the second context, wherein the first software item comprises a single resource comprising a piece of program code and metadata associated with the program code stored in the parent context by the first installation service and wherein the first software item is accessible to the child context and wherein configuration settings stored by the first configuration service in the parent context are accessible to the child context.

15. The computer-readable storage medium of claim 14, having further program code stored thereon, that when executed by a computing environment, causes the computing environment to:
   override metadata associated with a second software item in the child context, as directed by the parent context, wherein the child context comprises a second installation service that manages installation of the second software item, a second configuration service that manages configuration settings associated with the second software item and a second activation service that creates an execution environment for the second software item.

16. The computer-readable storage medium of claim 15, having further program code stored thereon, that when executed by a computing environment, causes the computing environment to:
   override the second software item executed in the child context, as directed by the parent context.

17. The computer-readable storage medium of claim 14, having further program code stored thereon, that when executed by a computing environment, causes the computing environment to:
   prevent the parent context from accessing a second software item of a child context, wherein the child context comprises a second installation service that manages installation of the second software item, a second configuration service that manages configuration settings associated with the second software item and a second activation service that creates an execution environment for the second software item.

* * * * *